United States Patent
Taniguchi

(10) Patent No.: US 8,466,948 B2
(45) Date of Patent: Jun. 18, 2013

(54) OPTICAL SCANNING DEVICE INCLUDING A PLURALITY OF LIGHT SOURCES

(75) Inventor: Hajime Taniguchi, Toyokawa (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 177 days.

(21) Appl. No.: 12/815,935

(22) Filed: Jun. 15, 2010

(65) Prior Publication Data

US 2010/0329743 A1   Dec. 30, 2010

(30) Foreign Application Priority Data

Jun. 30, 2009  (JP) .................................. 2009-155735

(51) Int. Cl.
*B41J 27/00*  (2006.01)
*B41J 2/435*  (2006.01)

(52) U.S. Cl.
USPC ........................... 347/242; 347/256; 347/245

(58) Field of Classification Search
USPC ........................... 347/263, 256, 242, 245, 257
See application file for complete search history.

(56) References Cited

U.S. PATENT DOCUMENTS

| | | | | |
|---|---|---|---|---|
| 7,017,815 | B2 * | 3/2006 | Wood ........................ | 235/462.14 |
| 2004/0184127 | A1 | 9/2004 | Nakajima et al. | |
| 2008/0084467 | A1 * | 4/2008 | Satou et al. ..................... | 347/132 |
| 2009/0115834 | A1 * | 5/2009 | Nakajima ..................... | 347/263 |

FOREIGN PATENT DOCUMENTS

| | | |
|---|---|---|
| JP | 5-210284 A | 8/1993 |
| JP | 09-127441 A | 5/1997 |
| JP | 2000-267026 A | 9/2000 |
| JP | 2000267026 A * | 9/2000 |
| JP | 2002-341276 A | 11/2002 |
| JP | 2004-286989 A | 10/2004 |
| JP | 2006-178190 A | 7/2006 |
| JP | 2006-227494 A | 8/2006 |
| JP | 2007-079400 A | 3/2007 |
| JP | 2008-097920 A | 4/2008 |
| JP | 2010-230805 A | 10/2010 |

OTHER PUBLICATIONS

Notice of Grounds of Rejection issued on Sep. 25, 2012 by the Japanese Patent Office in corresponding Japanese Application No. 2009-155735, and a translation thereof.
Notice of Allowance mailed Feb. 26, 2013 issued by the Japanese Patent Office in corresponding Japanese Patent Application No. 2009-155735, and a translation thereof.

* cited by examiner

*Primary Examiner* — Stephen Meier
*Assistant Examiner* — Sarah Al Hashimi
(74) *Attorney, Agent, or Firm* — Buchanan Ingersoll & Rooney PC

(57) ABSTRACT

An optical scanning device includes a plurality of light sources, at least two securing units provided for each of the light sources, and a substrate for driving the light sources. The components are arranged such that the direction "A" in which the light sources are arranged has an upward slant with respect to a lateral direction (i.e. X direction) of the substrate, and the direction "B" in which the at least two securing units provided for each of the light sources are arranged has a downward slant with respect to the lateral direction of the substrate. Accordingly, a compact optical scanning device can be provided.

22 Claims, 8 Drawing Sheets

OPTICAL SCANNING DEVICE INCLUDING A PLURALITY OF LIGHT SOURCES

This application is based on Japanese Patent Application No. 2009-155735 filed with the Japan Patent Office on Jun. 30, 2009, the entire content of which is hereby incorporated by reference.

BACKGROUND OF THE INVENTION

1. Field of the Invention

The present invention relates to an optical scanning device, and more particularly to an optical scanning device provided with a plurality of light sources.

2. Description of the Related Art

An image forming device using electrophotography (such as a multi function peripheral (MFP) provided with the scanner function, facsimile function, copying function, function as a printer, data communication function, and server function, a facsimile machine, a copier, a printer, and the like) may be configured to form an image by scanning the surface of an image carrier with a light beam emitted from an optical scanning device which is supported by a support member in the image forming device.

In particular, an image forming device configured as a tandem full-color printer includes therein an optical scanning device which outputs four laser beams including image information of yellow (Y), magenta (M), cyan (C), and black (K), respectively. The four laser beams enter into photoreceptor drums of the corresponding colors, whereby a tandem laser scanning optical device is established.

The optical scanning device includes therein a polygonal rotating mirror (i.e. a rotating reflector or a polygon mirror), a scanning lens (i.e. a fθ lens), a retroreflector, a reflector, a cylindrical lens, and other components. The optical scanning device further includes therein four laser light sources (which may also be simply referred to as "light sources") which output four laser beams. This enables image exposure processing for the four photoreceptor drums (i.e. image carriers).

In the conventional laser scanning optical devices, it is known to integrate the substrates for a plurality of laser light sources into one piece.

Specifically, Documents 1 and 2 below each disclose a configuration in which a plurality of substrates are integrated into one piece by arranging the laser light sources slantwise. In each configuration, securing units provided on the device housing side and for holding the substrate are arranged in a longitudinal direction. Substrate holding portions formed in the substrate each have a circular hole shape, and the substrate is fixedly secured to the housing by screws.

Document 3 below discloses a configuration in which a plurality of substrates are arranged on an attachment base member so as to integrate the substrates into one piece.

[Document 1] Japanese Patent Application Laid-Open No. 2007-79400
[Document 2] Japanese Patent Application Laid-Open No. 2008-97920
[Document 3] Japanese Patent Application Laid-Open No. 2006-227494

In recent years, color copiers, printers, and other image forming devices have been increasingly reduced both in size and cost. In particular, there is a demand for reduction in height of the devices. In terms of the optical devices, there is a demand for reduction in size in the sub-scanning direction.

In the case where it is tried to reduce the size (particularly the size in the sub-scanning direction) of the light source unit (including the light source, light-source holding member, substrate, and substrate holding portion) in the conventional configuration, however, the distance between the securing units arranged on the housing side and for holding the light-source holding member cannot be decreased without impairing the precision in holding the light source.

Furthermore, when the substrate holding portion is in a circular hole shape, a large area is required for securing the shape on the substrate, leading to an increase in size of the substrate and, hence, of the device. Still further, connectors connected to the substrate need to be arranged carefully in order to reduce the size of the device.

SUMMARY OF THE INVENTION

The present invention has been accomplished to solve the above-described problems, and an object of the present invention is to provide a compact optical scanning device.

To achieve the above object, according to an aspect of the present invention, an optical scanning device includes: a plurality of light sources; at least two securing units provided for each of the plurality of light sources; and a substrate for driving the plurality of light sources; wherein the plurality of light sources are arranged such that an arrangement direction of the light sources has one of an upward slant and a downward slant with respect to a lateral direction of the substrate, and the at least two securing units provided for each of the plurality of light sources are arranged such that an arrangement direction of the securing units has the other of the upward slant and the downward slant with respect to the lateral direction of the substrate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An image forming device according to an embodiment of the present invention will now be described.

The image forming device is capable of printing an image on a sheet of paper by electrophotography, on the basis of image data. The image forming device is of a so-called tandem type, which is configured to be able to form a color image by combining images of four colors of KCMY.

Embodiment

Figure 1:
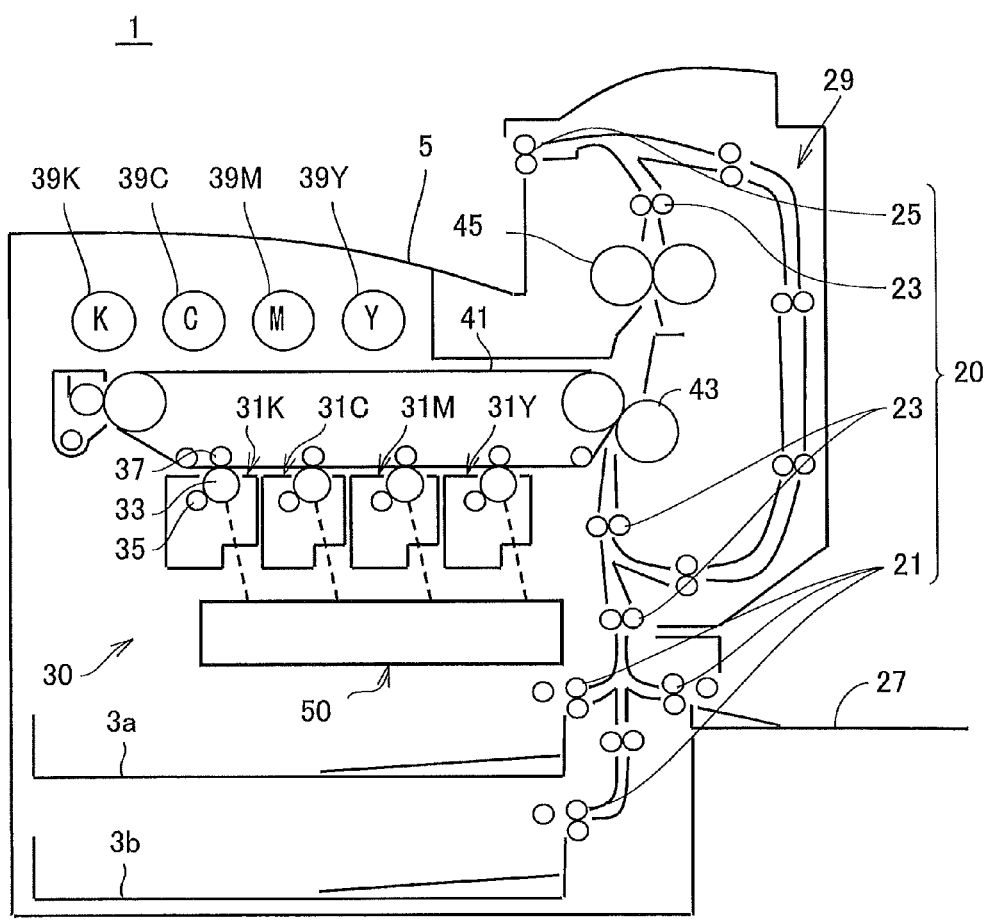
FIG. 1 shows an image forming device according to an embodiment of the present invention.

Referring to FIG. 1, an image forming device 1 includes paper cassettes 3a and 3b, and a catch tray 5. A paper transport unit 20, a printing unit 30, a control unit (not shown), and other components are provided in a housing of image forming device 1. The control unit is configured with a CPU, a memory, and the like, and controls operations of image forming device 1.

This image forming device 1 has two paper cassettes 3a and 3b, which may be mounted with sheets of different sizes (such as B5 size, A4 size, A3 size, and others). Paper cassettes 3a and 3b are disposed at a bottom part of image forming device 1 and are removable from the housing of image forming device 1. During printing, a sheet loaded into each of paper cassettes 3a, 3b is fed into the device from paper cassettes 3a, 3b, one by one, and is moved to printing unit 30. It should be noted that the number of paper cassettes 3a, 3b is not restricted to two; one cassette or more than two cassettes may be provided.

Catch tray 5 is disposed on top of the housing of image forming device 1. A sheet on which an image has been formed by printing unit 30 is discharged to catch tray 5 from inside the housing of image forming device 1.

Paper transport unit 20 is composed of a feed roller 21, a transport roller 23, a discharge roller 25, motors (not shown) for driving the rollers, and other components. Feed roller 21, transport roller 23, and discharge roller 25 each include two opposite rollers sandwiching a sheet therebetween, for example, which rollers are rotated to transport the sheet. Feed roller 21 feeds one sheet at a time from paper cassette 3a or 3b or from a manual feed unit 27 that is provided on the back of image forming device 1. Feed roller 21 feeds the sheet to a paper transport path inside the housing of image forming device 1. Transport roller 23 transports the sheet fed by feed roller 21 to a secondary transfer roller (which will be described later) provided in printing unit 30. Further, transport roller 23 transports the sheet that has passed fixing device 45 to discharge roller 25. Discharge roller 25 discharges the sheet that has been transported by transport roller 23 to the outside of the housing of image forming device 1. The discharged sheet is stacked on catch tray 5.

It should be noted that paper transport unit 20 is provided with a paper reversing unit 29. The use of paper reversing unit 29 enables printing on both sides of a sheet. Specifically, paper transport unit 20 operates such that the direction in which the sheet that has passed fixing device 45 is transported is reversed at the downstream side of fixing device 45, so that the sheet is fed into paper reversing unit 29. The sheet moves via paper reversing unit 29 to the upstream side of printing unit 30 on the paper transport path. As a result, the sheet is fed again into printing unit 30, with its sides reversed, thereby enabling printing of images on both sides of the sheet.

Printing unit 30 is composed of four image forming units 31K, 31C, 31M, and 31Y (hereinafter, they may be simply referred to as "image forming units 31") and four toner cartridges 39K, 39C, 39M, and 39Y for respective colors, an intermediate transfer belt 41, a secondary transfer roller 43, fixing device 45, an optical scanning device 50, and other components.

Intermediate transfer belt 41 forms a loop and is laid around a plurality of rollers. Paper transport unit 20 is rotated in synchronization with intermediate transfer belt 41. Secondary transfer roller 43 is positioned to face the portion of intermediate transfer belt 41 that is in contact with one roller. A sheet is sandwiched between and transported by intermediate transfer belt 41 and secondary transfer roller 43.

Each image forming unit 31 includes a photoreceptor drum (i.e. an example of an image carrier) 33, a development device 35, a cleaner, an electrifying device, and other components. Image forming units 31K, 31C, 31M, and 31Y are provided to form images of the corresponding colors of black (K), cyan (C), magenta (M), and yellow (Y). Image forming units 31K, 31C, 31M, and 31Y are arranged directly beneath intermediate transfer belt 41, side by side in this order from the upstream side of rotation of intermediate transfer belt 41. On top of each photoreceptor drum 33, a primary transfer roller 37 is disposed so as to sandwich intermediate transfer belt 41 between photoreceptor drum 33 and primary transfer roller 37.

Fixing device 45 has a heating roller and a pressure roller. Fixing device 45 transports a sheet, on which a toner image has been formed, by sandwiching the sheet between the heating roller and the pressure roller, while heating and pressing the sheet. In this manner, fixing device 45 melts the toner adhering to the sheet and fixes it on the sheet. The sheet that has passed fixing device 45 is discharged from the housing of image forming device 1 by discharge roller 25.

Optical scanning device 50 is arranged beneath image forming units 31. Optical scanning device 50 is configured as a unit. Optical scanning device 50 scans the surface of photoreceptor drum 33 in each image forming unit 31 with laser light, as will be described later. Optical scanning device 50 has its bottom side supported by a frame (i.e. an example of a support member) in image forming device 1.

Optical scanning device 50 uses image data for each color of KCMY to form a latent image on the corresponding photoreceptor drum 33 which has been uniformly electrified by the electrifying device. Development device 35 forms a toner image of each color on the corresponding photoreceptor drum 33. Primary transfer roller 37 transfers the toner image on each photoreceptor drum 33 onto intermediate transfer belt 41, so that a mirror image of the toner image to be formed on a sheet is formed on intermediate transfer belt 41 (primary transfer). On intermediate transfer belt 41, the toner images of black, cyan, magenta, and yellow are formed in this order. Thereafter, secondary transfer roller 43 transfers the toner images formed on intermediate transfer belt 41 onto a sheet, whereby a toner image is formed on the sheet (secondary transfer).

Figure 2:
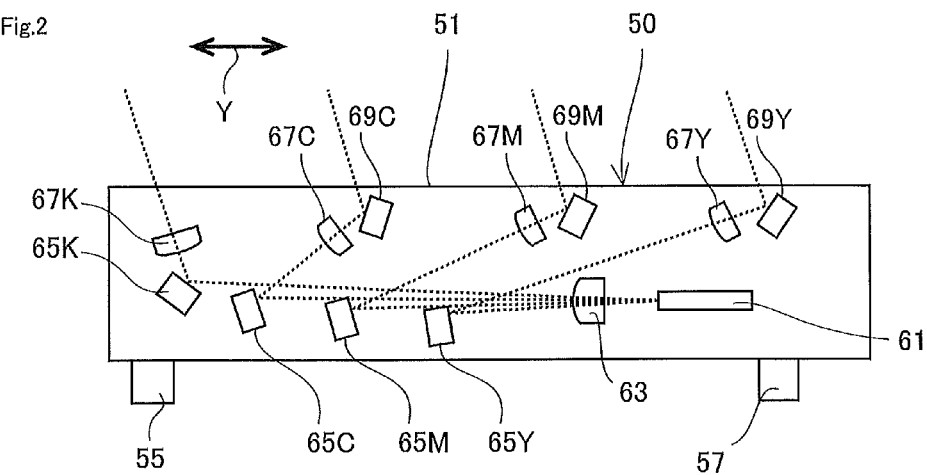
FIG. 2 is a side view showing the configuration of an optical scanning device.

FIG. 2 is a side view showing the configuration of optical scanning device 50.

Optical scanning device 50 is a unit of members which are mounted in a box-shaped enclosure 51. The structure of enclosure 51 will be described later.

Referring to FIG. 2, a deflector 61, a first scanning lens 63, reflecting mirrors 65K, 65C, 65M, and 65Y, second scanning lenses 67K, 67C, 67M, and 67Y, auxiliary reflecting mirrors 69C, 69M, and 69Y, light sources (not shown), and other components are housed in enclosure 51.

Deflector 61 includes a polygon mirror having a plurality of reflective surfaces on its sides and a motor (not shown). Deflector 61 uses the motor to rotate the polygon mirror, so as to scan the reflective surfaces with incident laser light. The light source is e.g. a semiconductor laser. One light source is provided for each of the four colors of KCMY. The laser light (i.e. an example of a light beam) emitted from each light source transmits a collimator lens, a cylindrical lens, and others (which are not shown), before being incident onto the mirror surfaces, or the reflective surfaces, of the polygon mirror in deflector 61.

Reflecting mirror 65K and second scanning lens 67K are optical elements for black (K). Reflecting mirror 65K and second scanning lens 67K are provided to cause the laser light for black, scanned by deflector 61, to be projected onto photoreceptor drum 33 included in image forming unit 31K for black. Similarly, reflecting mirror 65C, second scanning lens 67C, and auxiliary reflecting mirror 69C are for cyan (C).

Reflecting mirror 65M, second scanning lens 67M, and auxiliary reflecting mirror 69M are for magenta (M). Reflecting mirror 65Y, second scanning lens 67Y, and auxiliary reflecting mirror 69Y are for yellow (Y).

Reflecting mirrors 65K, 65C, 65M, and 65Y are arranged side by side in this order in an image-carrier arrangement direction (shown by an arrow Y in the figure) which is orthogonal to the main scanning direction. Second scanning lenses 67K, 67C, 67M, and 67Y are arranged corresponding to reflecting mirrors 65K, 65C, 65M, and 65Y, respectively.

Reflecting mirror 65K reflects the laser light for black, which has been scanned by deflector 61 and transmitted through first scanning lens 63 before being incident thereto, toward the surface of photoreceptor drum 33 in image forming unit 31K. Second scanning lens 67K causes the laser light reflected by reflecting mirror 65K to form an image on the surface of photoreceptor drum 33 in image forming unit 31K. As shown in the figure, these optical elements for black are arranged in a position distant from deflector 61 in the image-carrier arrangement direction, with their longitudinal direction in parallel with the main scanning direction. In the present embodiment, reflecting mirror 65K and second scanning lens 67K are arranged in enclosure 51 near its side surface that is parallel to the main scanning direction and distant from deflector 61.

Reflecting mirror 65C reflects the laser light for cyan, which has been scanned by deflector 61 and transmitted through first scanning lens 63 before being incident thereto. Second scanning lens 67C is arranged so as to transmit the laser light reflected by reflecting mirror 65C, and auxiliary reflecting mirror 69C is arranged so as to reflect the laser light toward the surface of photoreceptor drum 33 in image forming unit 31C. As a result, the laser light for cyan forms an image on the surface of photoreceptor drum 33 in image forming unit 31C. Similarly, reflecting mirror 65M, second scanning lens 67M, and auxiliary reflecting mirror 69M are arranged so as to cause the laser light for magenta to form an image on the surface of photoreceptor drum 33 in image forming unit 31M. Furthermore, reflecting mirror 65Y, second scanning lens 67Y, and auxiliary reflecting mirror 69Y are arranged so as to cause the laser light for yellow to form an image on the surface of photoreceptor drum 33 in image forming unit 31Y.

Figure 3:
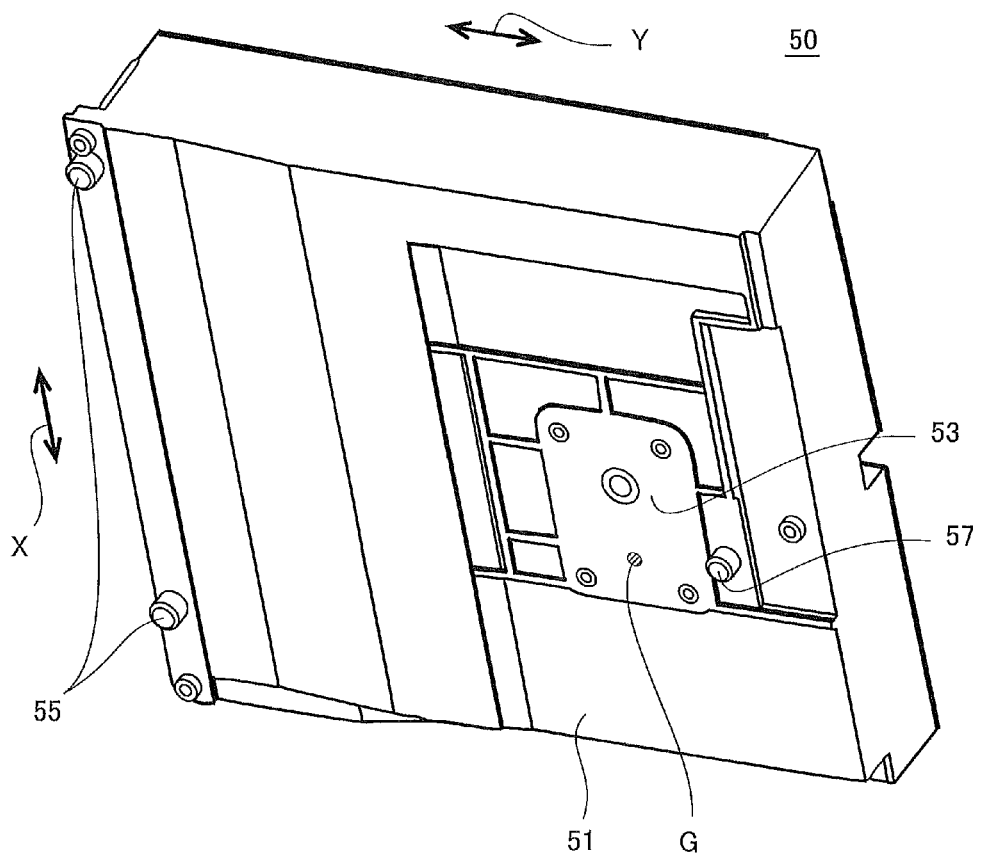
FIG. 3 is a perspective view of the optical scanning device.

FIG. 3 is a perspective view of optical scanning device 50.

Specifically, FIG. 3 shows the bottom side of optical scanning device 50. In the figure, the main scanning direction is shown by an arrow X, and the image-carrier arrangement direction is shown by an arrow Y. Referring to FIG. 3, enclosure 51 has a motor mounting portion 53, a positioning projection 55, and a position control projection (hereinafter, this may also be referred to as "control projection") 57. Enclosure 51 is formed using, for example, a synthetic resin reinforced with glass fiber or the like.

Inside the enclosure 51, a motor (not shown) for deflector 61 or the like is mounted on motor mounting portion 53. The motor is a relatively heavy member among the members constituting optical scanning device 50, and therefore, the center of gravity G of optical scanning device 50 is located near motor mounting portion 53 as seen from the bottom surface.

In the present embodiment, two positioning projections 55 are provided. Each positioning projection 55 has an approximately columnar shape, for example, and is formed to protrude downward from the bottom surface of enclosure 51. Each positioning projection 55 is arranged near the side surface of enclosure 51 that is approximately parallel to the main scanning direction and is distant from motor mounting portion 53. That is, positioning projections 55 are arranged near the side surface close to the optical elements for black. Each positioning projection 55 is located near reflecting mirror 65K for black and near the side end of optical scanning device 50. Two positioning projections 55 are arranged distant from each other and aligned in the main scanning direction.

Besides positioning projections 55, control projection 57 is provided to protrude downward from enclosure 51. In the present embodiment, control projection 57 has an approximately columnar shape. One control projection 57 is arranged at the bottom surface of enclosure 51, in the position distant from each positioning projection 55 in the image-carrier arrangement direction. In the present embodiment, control projection 57 is provided near the center of gravity G of optical scanning device 50.

Figure 4:
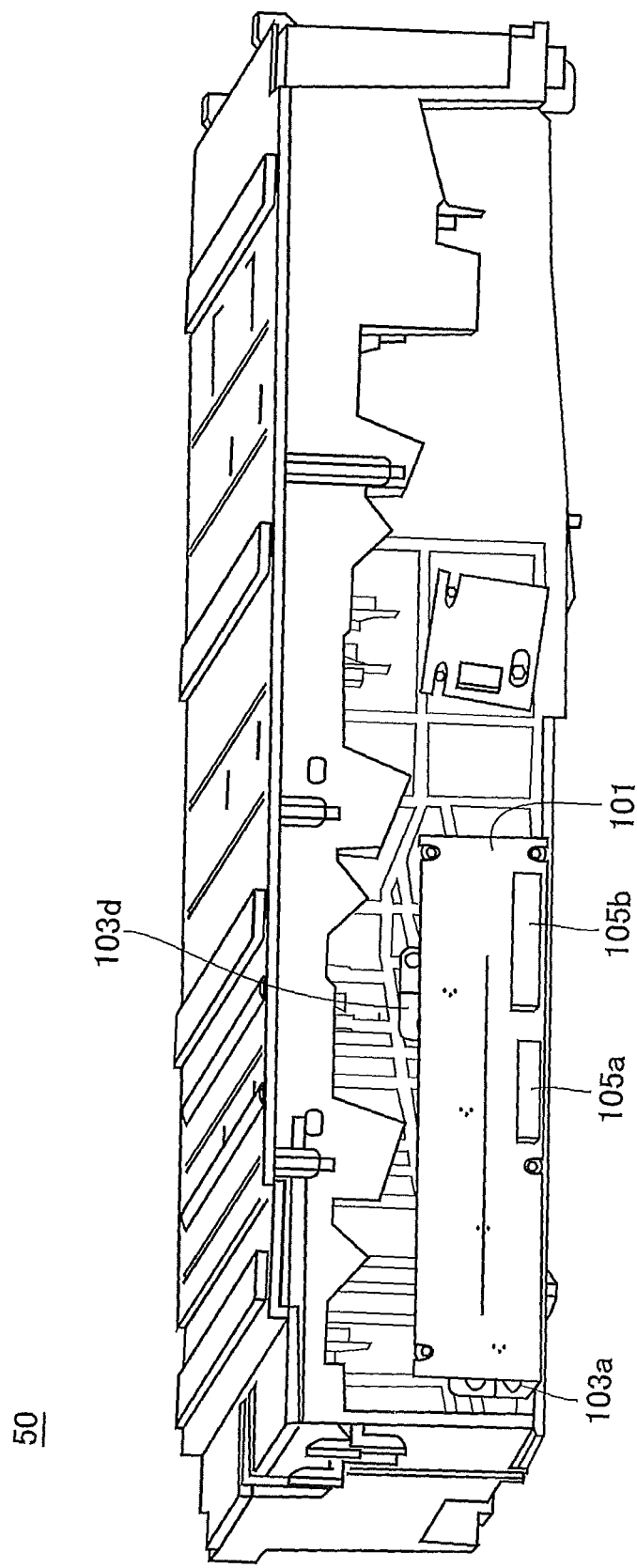
FIG. 4 is a side view of the optical scanning device as seen from the side on which light sources are attached.

FIG. 4 is a side view of optical scanning device 50, as seen from the side on which the light sources are attached.

The optical scanning device is a tandem-type laser scanning optical device, which is provided with a plurality of light sources (which may also be called "laser light sources" or "laser light emitting elements"). Each light source is held by a light-source holding member corresponding thereto. Each light source is electrically connected to a substrate (circuit board) 101.

It is observed in FIG. 4 that, among four light-source holding members 103a to 103d, light-source holding members 103a and 103d each partially protrude from (or extend beyond) the end of substrate 101. When the light-source holding member is arranged in this manner so as to partially protrude from the arrangement position (i.e. the project plane) of the substrate as seen from the substrate mounting direction, the substrate can be reduced in size and all the light sources can be held reliably.

Substrate 101 is provided with a plurality of connectors 105a and 105b for electrical connection with external devices. Connector 105a is smaller in size than connector 105b.

Figure 5:
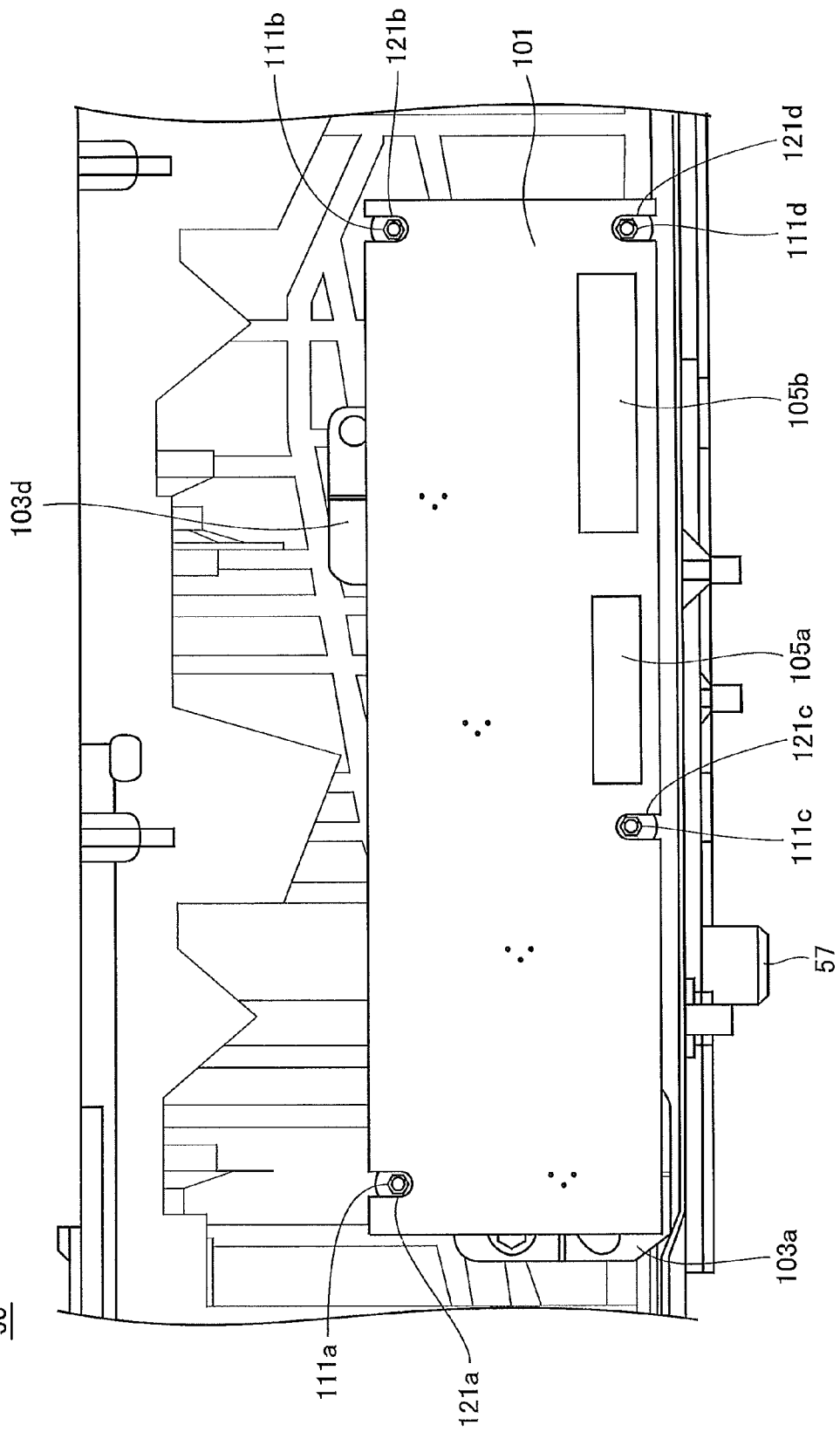
FIG. 5 is an enlarged view of a part including a substrate 101 of FIG. 4.

FIG. 5 is an enlarged view of the part including substrate 101 of FIG. 4.

Referring to FIG. 5, substrate 101 has notches on its periphery which are cut toward the inside. The notches function as substrate holding portions 121a to 121d. Each of substrate holding portions 121a to 121d has an approximately U shape which is open in the vertical direction.

Optical scanning device 50 has substrate securing units 111a to 111d. Substrate securing units 111a to 111d fit into substrate holding portions 121a to 121d, respectively, so that substrate 101 is fixedly secured to optical scanning device 50.

It should be noted that each portion depicted by three dots inside substrate 101 in FIG. 5 (four such portions are arranged slantwise) indicates the place where the light source is mounted. Substrate 101 functions to operate a plurality of light sources. The functions for operating the respective light sources are combined to provide one piece of substrate.

Substrate holding portions 121c and 121d are arranged to sandwich two connectors 105a and 105b therebetween, so that the connectors can be collected in one place. This enables reduction in size of the substrate. Further, the substrate can be fixedly secured near the connectors, which can suppress connection failure of the connectors as well as strain of the substrate.

Furthermore, connectors 105a and 105b of different sizes are arranged, with the one greater in size being arranged closer to the end of the substrate. This ensures that the space created by obliquely arranged the light sources can be used effectively, thereby enabling reduction in size of the substrate.

Moreover, the connectors are arranged slantwise with respect to the lateral direction of the substrate. Thus, the connectors can be arranged in the space available in correspondence with the slanting arrangement of the light sources.

Figure 6:
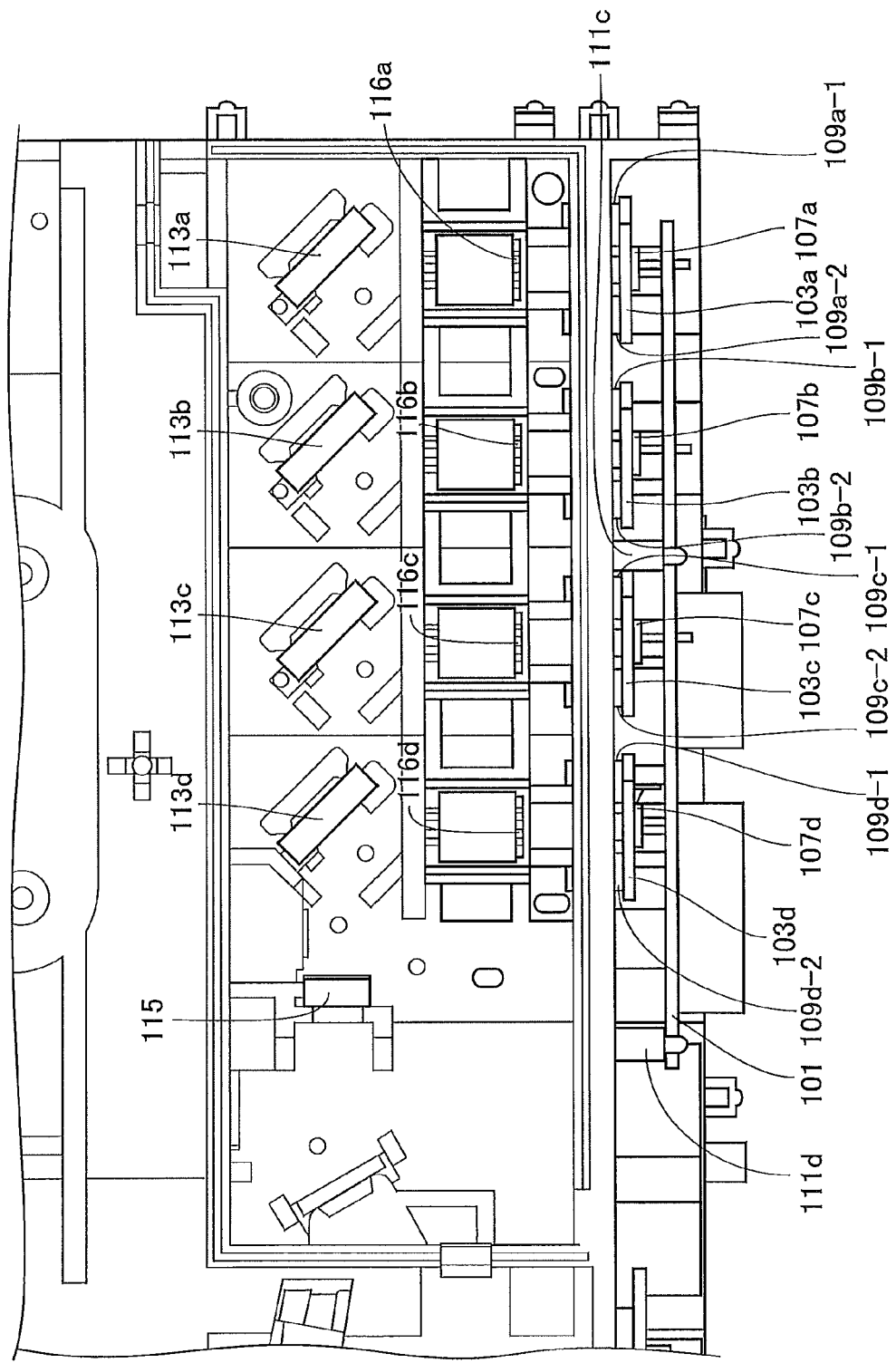
FIG. 6 shows an internal configuration, as seen from bottom, of the optical scanning device in FIG. 5.
Figure 7:
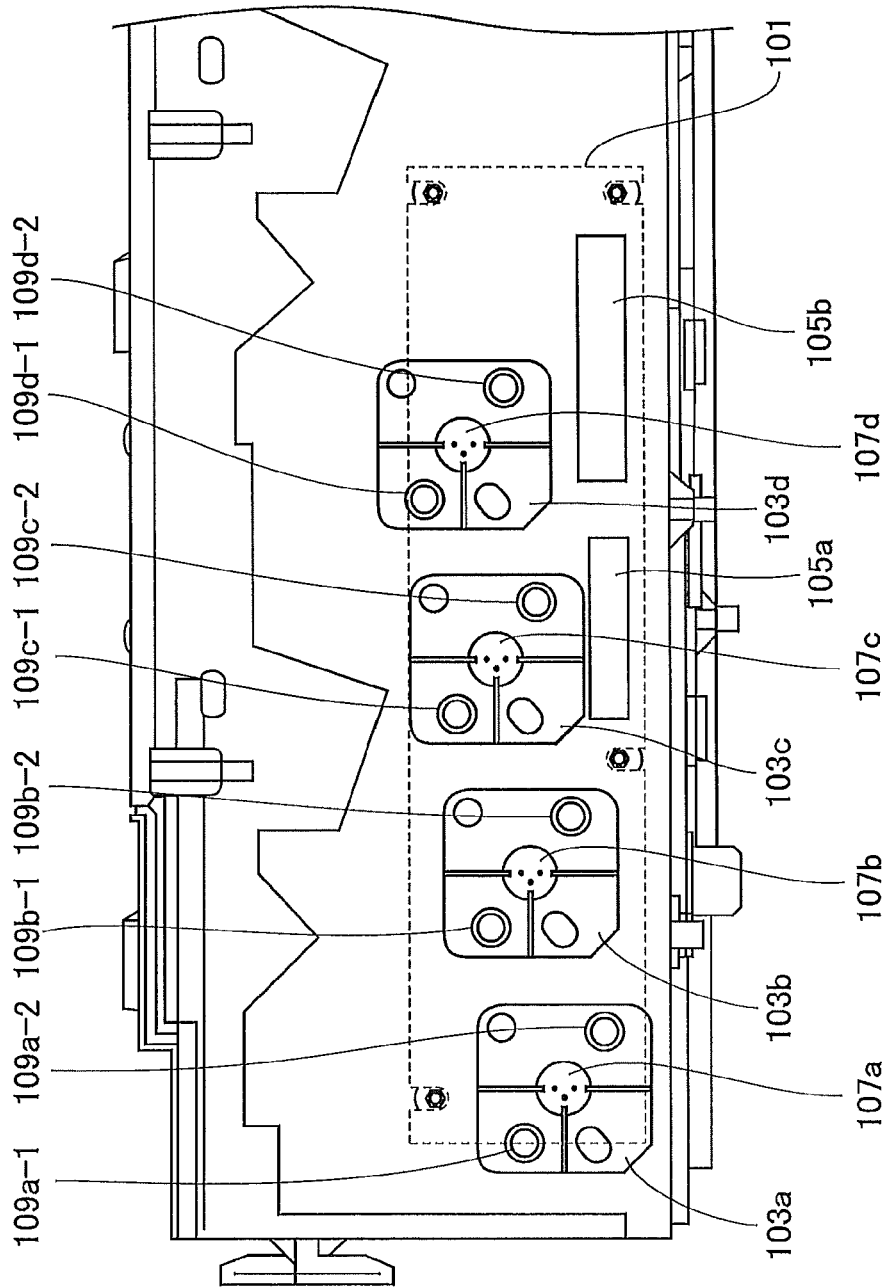
FIG. 7 illustrates the configuration behind substrate 101 in FIG. 4 by depicting substrate 101 in a broken line.

FIG. 6 shows an internal configuration, as seen from bottom, of the optical scanning device in FIG. 5 FIG. 7 shows substrate 101 in FIG. 4 in a broken line so as to illustrate the configuration behind the substrate.

A plurality of light sources 107a to 107d are electrically connected to substrate 101. Light sources 107a to 107d are held and positioned by the corresponding light-source holding members 103a to 103d.

Light-source holding members 103 to 103d are fixedly secured to optical scanning device 50 by means of corresponding securing units (bosses) 109a-1, 109a-2, 109b-1, 109b-2, 109c-1, 109c-2, 109d-1, and 109d-2 which are provided at optical scanning device 50. As a result, the light sources are also fixedly secured to optical scanning device 50.

Furthermore, as explained above, substrate securing units 111a to 111d engage the corresponding substrate holding portions 121a to 121d, whereby substrate 101 is fixedly secured to optical scanning device 50.

Inside the optical scanning device (i.e. inside the housing), collimator lenses 116a to 116d and mirrors 113a to 113d are provided corresponding to light sources 107a to 107d. A cylindrical lens 115 is also provided therein.

While the light sources may be arranged arbitrarily, in the case of using an oblique-incidence optical system, generally, the light sources for the respective colors are different in terms of positions (or heights) in relation to the sub-scanning direction. The light sources are held by light-source holding members (i.e. LD holders), and the light-source holding members are held by securing units (bosses) protruding from the housing of the optical scanning device.

For each light source, two securing units (bosses) are arranged in the opposing positions sandwiching the light source therebetween, so as to hold the light-source holding member (LD holder) for that light source.

Figure 8:
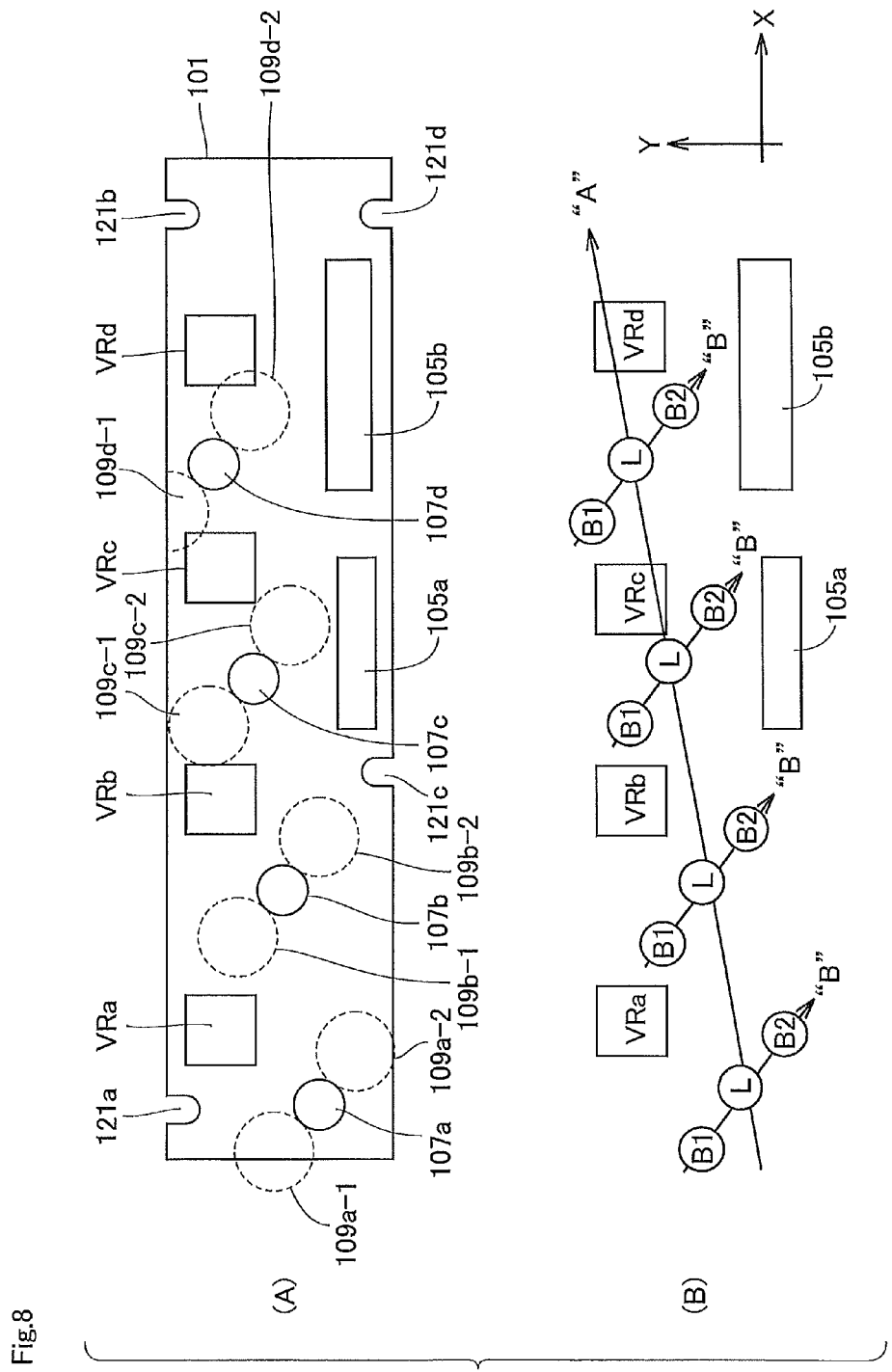
FIG. 8 illustrates a positional relationship of respective members with respect to substrate 101.

FIG. 8 illustrates a positional relationship of the components with respect to substrate 101.

FIG. 8(A) shows arrangement of light sources 107a to 107d, project planes (shown by circles of broken lines) of securing units (bosses) 109a-1, 109a-2, 109b-1, 109b-2, 109c-1, 109c-2, 109d-1, and 109d-2 for holding the corresponding light-source holding members 103a to 103d, volumes VRa to VRd provided on substrate 101 and for adjusting the light intensities of the corresponding light sources 107a to 107d, and connectors 105a and 105b.

Further, in FIG. 8(B), for easier understanding of the positional relationship of the components, the positions where four light sources 107a to 107d are located are each shown by 'L', the positions where the securing units (bosses) for securing the upper left corners of light-source holding members 103a to 103d are each shown by 'B1', and the positions where the securing units (bosses) for securing the lower right corners of light-source holding members 103a to 103d are each shown by 'B2'. The positions of volumes VRa to VRd and connecters 105a and 105b are shown as well.

In FIG. 8, unlike the definitions of the X and Y directions in FIGS. 2 and 3, the direction in which the upper and lower ends of the substrate extend is the X direction (i.e. the lateral direction of the substrate), with the direction from light-source holding member 103a toward light-source holding member 103d being the positive direction, and the direction in which the left and right ends of the substrate extend is the Y direction.

As shown in FIG. 8(B), the light sources (L) are arranged slantwise with respect to the X and Y directions. This arrangement direction is shown by "A", with the direction from light-source holding member 103a toward light-source holding member 103d being the positive direction. Specifically, the arrangement direction "A" slants upward in the positive direction of the X direction.

A line connecting the position (B1) of the securing unit (boss) for securing the upper left corner of one of light-source holding members 103a to 103d and the position (B2) of the securing unit (boss) for securing the lower right corner of the same light-source holding member also has a slant with respect to the X and Y directions. This arrangement direction of the securing units is shown by "B", with the direction from the position (B1) of the upper left securing unit (boss) toward the position (B2) of the lower right securing unit (boss) being the positive direction. Specifically, the arrangement direction "B" slants downward in the positive direction of the X direction.

In this manner, the securing units (bosses), arranged on the optical scanning device housing side, for fixedly securing a certain light-source holding member are obliquely arranged in the direction crossing the arrangement direction of the obliquely arranged light sources. This increases the distance between the neighboring light-source holding members and securing units therefor. Accordingly, the light sources can be arranged closer to each other, whereby the substrate can be reduced in size. Furthermore, in one light-source holding member, the span between the securing units can be increased without the need of increasing the size in the sub-scanning direction. This improves the precision in holding the light source.

Specifically, when the arrangement direction of the light sources has one of an upward slant and a downward slant, the two securing units (bosses) for holding one light-source holding member are arranged in a direction which has the other one of the upward slant and the downward slant.

Moreover, substrate holding portions 121a to 121d arranged on the periphery of substrate 101 each have an approximately U shape that is open in the vertical direction. This makes it possible to readily form the substrate pattern while avoiding the substrate holding portions, whereby the degree of freedom in designing increases. If circular holes are used as the substrate holding portions, it would be necessary to secure a certain distance from the circular hole to the substrate periphery. In the present embodiment, it is possible to decrease this distance, whereby the size reduction becomes possible.

Furthermore, all the connectors 105a and 105b are arranged in the space beneath the obliquely arranged light sources, which ensures effective use of the unnecessary portion of the substrate. Moreover, volumes VRa to VRd for adjusting the light intensities are arranged in the space above the light sources, which facilitates use of a tool for volume adjustment, whereby the workability improves.

Effects of the Embodiment

As described above, a laser scanning optical device is provided which includes a plurality of light sources and a deflector that deflects the beams from the light sources on a same plane, and which is configured to expose the surfaces of a plurality of photoreceptors to different beams deflected by the deflector via a scanning optical system composed of a plurality of optical elements. The substrate for the plurality of light sources is an integrated substrate which is held in the housing of the laser scanning optical device.

The securing units arranged on the housing side and for holding the holding member of each light source are obliquely arranged to have a slant that is opposite to the slant of the arrangement direction of the obliquely arranged light sources.

More specifically, at least two securing units are provided for each of the plurality of light sources. The arrangement direction of the light sources has one of an upward slant and a downward slant with respect to a lateral direction of the substrate (i.e. the X direction in FIG. 8), and the arrangement direction of the at least two securing units provided for each of the light sources has the other one of the upward slant and the downward slant with respect to the lateral direction of the substrate.

With this configuration, the size in the Y direction of the substrate (and the size in the X direction thereof) can be reduced. Furthermore, the securing units can be arranged effectively in the vicinity of the light sources, whereby the distance between the neighboring light sources can be reduced.

The substrate holding portions provided on the periphery of the substrate each have an approximately U shape which is open in the vertical direction. All the connectors are arranged within the space beneath the obliquely arranged light sources.

With the configuration as described above, the light source unit (including the light sources, light-source holding members, substrate, and substrate holding portions) of the tandem-type laser scanning optical device can be reduced both in size and cost, without impairment of the optical performance.

Figure 9:
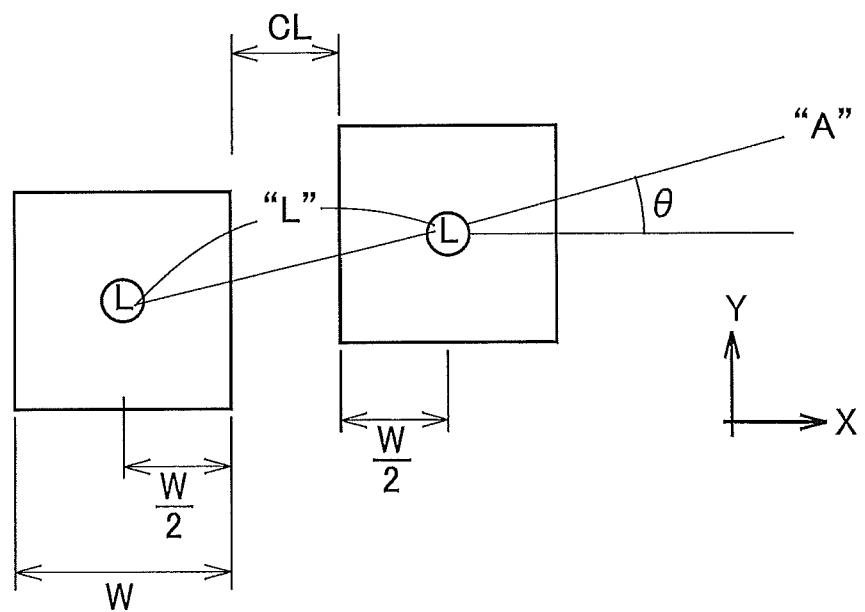
FIG. 9 illustrates effects of the embodiment.

FIG. 9 illustrates the effects of the present embodiment.

In FIG. 9, the position of each light source is shown by 'L', the width of a light-source holding member (LD holder) is shown by 'W', and the clearance between the light-source holding members (LD holders) is shown by 'CL'. Further, the slant angle that the light source arrangement direction "A" makes with the X direction is shown by 'θ', and the distance between the light sources is shown by '"L"'.

Here, the clearance CL between the light-source holding members (LD holders) is represented by the following expression:

$$CL = \text{``L''} * \cos\theta - W$$

This means that the clearance CL increases as θ approaches 0, ensuring a sufficient margin, so that it is possible to decrease the distance "L" between the light sources. As a result, the substrate can be reduced in size.

More specifically, as shown in FIG. 8, the securing units (bosses) arranged on the optical scanning device housing side and for fixedly securing a light-source holding member are obliquely arranged in the direction (the "B" direction in the figure that is obtained by turning the X direction clockwise), each crossing the arrangement direction of the obliquely arranged light sources (the "A" direction in the figure that is obtained by turning the X direction counterclockwise). This makes it possible to reduce θ shown in FIG. 9 close to 0. The light-source holding member shown in FIG. 8 can be turned more counterclockwise than a light-source holding member can that has the securing units (bosses) arranged vertically where the position B1 is upper and the position B2 is lower in FIG. 8, and a sufficient margin of clearance CL shown in FIG. 9 is consequently ensured. This also makes it possible to increase the distance between the neighboring light-source holding members and, thus, facilitates arrangement of the holding members.

That is, with the arrangement of the components as described above, the height in the sub-scanning direction can be restricted, while increasing the distance between the light-source holding members (LD holders).

Moreover, the substrate is held by the bosses that protrude from the optical device housing. On the substrate side, the notches are provided on its periphery, each having an approximately U shape that is open in the vertical direction. The bosses on the device housing side have their tip ends protruding from the notches onto the substrate surface. An adhesive is applied to the protruding portions so as to fixedly secure the substrate.

The shape of the notch has a certain clearance with respect to the boss. This improves the workability in the substrate mounting process when it is necessary to fit a pin protruding from the light source. It should be noted that a similar effect can be obtained when screws and the like are used to secure the substrate to the bosses.

The notches are arranged on the periphery of the substrate. This makes it easy to avoid the notch portions when forming the substrate pattern, thereby increasing the degree of freedom in designing. As compared with the case where holes are used, the size of the substrate in the sub-scanning direction can be reduced.

Connectors need to be provided on the substrate for connection with an MFP or a printer body. As all the connectors are arranged in the space beneath the obliquely arranged light sources, the unnecessary portion of the substrate can be used effectively for arranging the connectors, thereby enabling size reduction. Furthermore, the adjusting volumes are arranged in the space on the upper side, which facilitates use of the tools and thus improves workability.

Others

It should be noted that the optical scanning device is not restricted to the one which rotates a mirror for scanning with laser light. The optical scanning device may be the one which uses an oscillating element and others for scanning with laser light.

Furthermore, the image forming device may be any of a color copier, a printer, a facsimile machine, or a composite machine thereof (MFP).

According to the above-described embodiment, a compact optical scanning device and an image forming device using the same can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical scanning device comprising:
   a plurality of light sources;
   at least two securing units provided for each of said plurality of light sources;
   a substrate for driving said plurality of light sources; and
   a plurality of substrate holding portions for holding said substrate, wherein each of said plurality of substrate holding portions is a notch formed on a periphery of said substrate;
   wherein said plurality of light sources are arranged such that an arrangement direction of said light sources has one of an upward slant and a downward slant with respect to a lateral direction of said substrate, and
   the at least two securing units provided for each of said plurality of light sources are arranged such that an arrangement direction of said securing units has the other of the upward slant and the downward slant with respect to the lateral direction of said substrate.

2. The optical scanning device according to claim 1, wherein at least one of said plurality of light sources is fitted to a light-source holding member, and said light-source holding member is fixedly secured by said securing units.

3. The optical scanning device according to claim 2, wherein at least part of said light-source holding member protrudes from an arrangement position of said substrate.

4. The optical scanning device according to claim 1, wherein each of the plurality of substrate holding portions has an approximately U shape, which is open in a vertical direction.

5. An optical scanning device comprising:
a plurality of light sources;
at least two securing units provided for each of said plurality of light sources;
a substrate for driving said plurality of light sources;
wherein said plurality of light sources are arranged such that an arrangement direction of said light sources has one of an upward slant and a downward slant with respect to a lateral direction of said substrate, and
the at least two securing units provided for each of said plurality of light sources are arranged such that an arrangement direction of said securing units has the other of the upward slant and the downward slant with respect to the lateral direction of said substrate; and
a plurality of substrate holding portions for holding said substrate, wherein said substrate has a connecter, and said plurality of substrate holding portions are arranged so as to sandwich said connector therebetween.

6. The optical scanning device according to claim 5, wherein said connector includes at least two connectors which are different in size from each other, and the connector that is greater in size is arranged at a position closer to an end of said substrate.

7. The optical scanning device according to claim 5, wherein said connector includes at least two connectors, and said at least two connectors are arranged slantwise with respect to the lateral direction of said substrate.

8. The optical scanning device according to claim 5, wherein said plurality of substrate holding portions are notches which are formed on ends of said substrate.

9. An image forming device including an optical scanning device, the optical scanning device comprising:
a plurality of light sources;
at least two securing units provided for each of said plurality of light sources;
a substrate for driving said plurality of light sources; and
a plurality of substrate holding portions for holding said substrate, wherein each of said plurality of substrate holding portions is a notch formed on a periphery of said substrate;
wherein said plurality of light sources are arranged such that an arrangement direction of said light sources has one of an upward slant and a downward slant with respect to a lateral direction of said substrate, and
the at least two securing units provided for each of said plurality of light sources are arranged such that an arrangement direction of said securing units has the other of the upward slant and the downward slant with respect to the lateral direction of said substrate.

10. The image forming device according to claim 9, wherein at least one of said plurality of light sources is fitted to a light-source holding member, and said light-source holding member is fixedly secured by said securing units.

11. The image forming device according to claim 10, wherein at least part of said light-source holding member protrudes from an arrangement position of said substrate.

12. The image forming device according to claim 9, wherein each of the plurality of substrate holding portions has an approximately U shape, which is open in a vertical direction.

13. An image forming device including an optical scanning device, the optical scanning device comprising:
a plurality of light sources;
at least two securing units provided for each of said plurality of light sources;
a substrate for driving said plurality of light sources;
wherein said plurality of light sources are arranged such that an arrangement direction of said light sources has one of an upward slant and a downward slant with respect to a lateral direction of said substrate, and
the at least two securing units provided for each of said plurality of light sources are arranged such that an arrangement direction of said securing units has the other of the upward slant and the downward slant with respect to the lateral direction of said substrate; and
a plurality of substrate holding portions for holding said substrate, wherein said substrate has a connecter, and said plurality of substrate holding portions are arranged so as to sandwich said connector therebetween.

14. The image forming device according to claim 13, wherein said connector includes at least two connectors which are different in size from each other, and the connector that is greater in size is arranged at a position closer to an end of said substrate.

15. The image forming device according to claim 13, wherein said connector includes at least two connectors, and said at least two connectors are arranged slantwise with respect to the lateral direction of said substrate.

16. The image forming device according to claim 13, wherein said plurality of substrate holding portions are notches which are formed on ends of said substrate.

17. An optical scanning device comprising:
a plurality of light sources;
at least two securing units provided for each of said plurality of light sources;
a substrate for driving said plurality of light sources;
wherein said plurality of light sources are arranged such that an arrangement direction of said light sources has one of an upward slant and a downward slant with respect to a lateral direction of said substrate;
the at least two securing units provided for each of said plurality of light sources are arranged such that an arrangement direction of said securing units has the other of the upward slant and the downward slant with respect to the lateral direction of said substrate; and
wherein for each of the plurality of light sources, the at least two securing units are arranged in opposing positions, which sandwiches the light source therebetween.

18. The optical scanning device according to claim 17, wherein each of the plurality of light sources has a light source holding member, and wherein the at least two securing units secures the light source to the substrate for that light source.

19. An optical scanning device comprising:
a plurality of light sources;
at least two securing units provided for each of said plurality of light sources;
a substrate for driving said plurality of light sources;
wherein said plurality of light sources are arranged such that an arrangement direction of said light sources has one of an upward slant and a downward slant with respect to a lateral direction of said substrate;

the at least two securing units provided for each of said plurality of light sources are arranged such that an arrangement direction of said securing units has the other of the upward slant and the downward slant with respect to the lateral direction of said substrate; and wherein each of the plurality of light sources has a light source holding member, and the at least two securing units are arranged to secure an upper corner and an opposing lower corner of the light source holding member to the substrate for each of the plurality of light sources.

20. An image forming device including an optical scanning device, the optical scanning device comprising:

a plurality of light sources;

at least two securing units provided for each of said plurality of light sources; and a substrate for driving said plurality of light sources;

wherein said plurality of light sources are arranged such that an arrangement direction of said light sources has one of an upward slant and a downward slant with respect to a lateral direction of said substrate, the at least two securing units provided for each of said plurality of light sources are arranged such that an arrangement direction of said securing units has the other of the upward slant and the downward slant with respect to the lateral direction of said substrate, and wherein for each of the plurality of light sources, the at least two securing units are arranged in opposing positions, which sandwiches the light source therebetween.

21. The optical scanning device according to claim 20, wherein each of the plurality of light sources has a light source holding member, and wherein the at least two securing units secures the light source to the substrate for that light source.

22. An image forming device including an optical scanning device, the optical scanning device comprising:

a plurality of light sources;

at least two securing units provided for each of said plurality of light sources; and a substrate for driving said plurality of light sources;

wherein said plurality of light sources are arranged such that an arrangement direction of said light sources has one of an upward slant and a downward slant with respect to a lateral direction of said substrate, the at least two securing units provided for each of said plurality of light sources are arranged such that an arrangement direction of said securing units has the other of the upward slant and the downward slant with respect to the lateral direction of said substrate, and wherein each of the plurality of light sources has a light source holding member, and the at least two securing units are arranged to secure an upper corner and an opposing lower corner of the light source holding member to the substrate for each of the plurality of light sources.

* * * * *